(12) United States Patent
Mazyar et al.

(10) Patent No.: US 8,808,567 B2
(45) Date of Patent: *Aug. 19, 2014

(54) MAGNETIC NANOPARTICLES AND MAGNETORHEOLOGICAL FLUID COMPRISING SAME

(75) Inventors: Oleg A. Mazyar, Houston, TX (US);
Soma Chakraborty, Houston, TX (US);
Terry R. Bussear, Spring, TX (US);
Michael H. Johnson, Katy, TX (US)

(73) Assignee: Baker Hughes Incorporated, Houston, TX (US)

(*) Notice: Subject to any disclaimer, the term of this patent is extended or adjusted under 35 U.S.C. 154(b) by 200 days.

This patent is subject to a terminal disclaimer.

(21) Appl. No.: 13/288,419

(22) Filed: Nov. 3, 2011

(65) Prior Publication Data
US 2013/0112911 A1    May 9, 2013

(51) Int. Cl.
*H01F 1/44* (2006.01)
*H01F 1/01* (2006.01)
*B82Y 30/00* (2011.01)

(52) U.S. Cl.
CPC . *H01F 1/01* (2013.01); *B82Y 30/00* (2013.01);
*H01F 1/44* (2013.01); *Y10S 977/777* (2013.01);
*Y10S 977/838* (2013.01)
USPC ............. 252/62.55; 252/62.52; 428/403; 428/570; 977/777; 977/838

(58) Field of Classification Search
USPC ......... 428/570, 403; 252/62.55; 977/777, 838
See application file for complete search history.

(56) References Cited

U.S. PATENT DOCUMENTS

| 6,096,235 A | 8/2000 | Asako et al. |
| 6,280,658 B1 | 8/2001 | Atarashi et al. |
| 2006/0040103 A1 | 2/2006 | Whiteford et al. |

FOREIGN PATENT DOCUMENTS

| KR | 10-0659590 B1 | 12/2006 |
| KR | 10-2011-0065600 A | 6/2011 |
| KR | 10-2011-0105311 A | 9/2011 |
| WO | WO 2008/055371 | * 5/2008 |
| WO | WO 2011/136654 | * 11/2011 |

OTHER PUBLICATIONS

Ma et al, "Chemical Functionalization of Magnetic Carbon-encapsulated Nanoparticles Based on Acid Oxidization", J. Phys. Chem. B, Sep. 2006, 110, pp. 20118-20122.*
Grass et al, "Covalently Functionalized Cobalt Nanoparticles as aPlatform for Magnetic Separations in Organic Synthesis", Angew. Chem. Int. Ed., May 2007, 46, pp. 4909-4912.*
L S Panchakarla et al., "Carbon nanostructures and graphite-coated metal nanostructures obtained by pyrolysis of ruthenocene and ruthenocene-ferrocene mixtures," Bull. Mater. Sci., vol. 30, No. 1, Feb. 2007, pp. 23-29.
Nick Caiulo et al., "Carbon-Decorated FePt Nanoparticles,"Adv. Funct. Mater., 2007, vol. 17, pp. 1392-1396.
Rahul Sen et al., "Carbon nanotubes by the metallocene route,"Chemical Physics Letters, vol. 267, Issues 3-4, Mar. 1997, pp. 276-280.
Norman A. Luechinger, Norman Booth, Greg Heness, Sri Bandyopadhyay, Robert N. Grass, and Wendelin J. Stark; "Surfactant-Free, Melt-Processable Metal Polymer Hybrid Materials: Use of Graphene as a Dispersing Agent," Adv. Mater. 2008, 20, 3044-3049.
Chul-Jin Choi et al., "Preparation and Characterization of Magnetic Fe, Fe/C and Fe/N Nanoparticles Synthesized by Chemical Vapor Condensation Process," Rev. Adv. Mater. Sci., 2003, vol. 5, pp. 487-492.
International Search Report and Written Opinion; Date of Mailing May 15, 2013, International Application No. PCT/US2012/058952, Korean Intellectual Property Office; Written Opinon pp. 1-7, Search Report 8-9.
Lei et al., Shell-isolated nanoparticle-enhanced Raman spectroscopy, Nature, vol. 464, Mar. 18, 2010, pp. 392-395.
Norman A. Luechinger et al., "Surfactant-Free, Melt-Processable Metal-Polymer Hybrid Materials: Use of Graphene as a Dispersing Agent," Adv. Mater. 2008, vol. 20, pp. 3044-3049.
Cassagneau, Thierry, et al. "Contiguous Silver Nanoparticle Coatings on Die Lectric Spheres", Advanced Materials, 2002, vol. 14. No. 10 pp. 732-736, See abstract, p. 735, Fig. 1; pp. 732-736.
Jiaxing, Li, et al., Giant Electrorheological Fluid comprising nanoparticles: Carbon nanotube composite, Journal of Applied Physics, 2010, vol. 107, pp. 09357-1-09357-5, see abstract, col. 2 of p. 093507-2, Fig. 2.

* cited by examiner

*Primary Examiner* — Carol M Koslow
(74) *Attorney, Agent, or Firm* — Cantor Colburn LLP

(57) ABSTRACT

A nanoparticle composition comprises a ferromagnetic or superparamagnetic metal nanoparticle, and a functionalized carbonaceous coating on a surface of the ferromagnetic or superparamagnetic metal nanoparticle. A magnetorheological fluid comprises the nanoparticle composition.

14 Claims, No Drawings

MAGNETIC NANOPARTICLES AND MAGNETORHEOLOGICAL FLUID COMPRISING SAME

BACKGROUND

Field-sensitive rheological fluids are compositions that generally include dielectric and/or magnetic particles suspended in a base fluid, and that show a change in viscosity when in the presence of an electric or magnetic field, respectively. Such field-sensitive rheological fluids are referred to in the art as "smart" fluids. In such fluids these particles are polarized in the presence of the applied electric field or magnetized in the presence of the applied magnetic field. The particles interact by aligning and orienting to form chain-like and/or lattice-like structures within the base fluid, aligned to the field. In turn, the aligned particles cause an increase in the effective viscosity of the bulk fluid. Removal of the field causes the particles to de-orient and to adopt an amorphous configuration, and hence, viscosity in turn decreases.

Typically, such field-sensitive rheological fluids include electrorheological fluids of polarizable materials with a low conductivity and a high dielectric constant, such as low molecular weight phenolic/phenolate oligomers, salts of (meth)acrylate oligomers and polymers, and other such materials, or magnetorheological fluids of magnetic particles suspended in a base fluid such as an aqueous fluid, or an organic or inorganic fluid such as a silicone or mineral oil. However, there remains a need for field-sensitive rheological fluids with improved properties such as a greater range of effective viscosity for a given magnetic field strength and loading of the polarizable or magnetic materials, and a faster response time as well as high temperature performance.

SUMMARY

The above and other deficiencies in the prior art are be overcome by, in an embodiment, a nanoparticle composition comprises a ferromagnetic or superparamagnetic metal nanoparticle, and a functionalized carbonaceous coating on a surface of the ferromagnetic or superparamagnetic metal nanoparticle.

In another embodiment, a magnetorheological fluid comprises a nanoparticle composition comprising a ferromagnetic or superparamagnetic metal nanoparticle, and a functionalized carbonaceous coating on a surface of the ferromagnetic or superparamagnetic metal nanoparticle; and an aqueous or non-aqueous base fluid.

In another embodiment, a nanoparticle composition comprises a reaction product of an organometallic compound comprising Ag, Al, Au, Co, Cu, Fe, Hf, In, Ir, Mo, Nd, Ni, Pd, Pt, Rh, Ru, Sm, Sn, Ti, V, Y, Zr, alloys thereof, or a combination comprising at least one of the foregoing, the reaction product comprising a core of the metal of the organometallic compound, and a functionalized carbonaceous coating on a surface of the core, the functionalized carbonaceous coating comprising a carbon onion structure, nanotubes, fullerene structure, graphite, graphene, carbon black, a worm-like graphene structure, or a combination comprising at least one of the foregoing structures.

In another embodiment, a magnetorheological fluid comprises a nanoparticle composition comprising a ferromagnetic or superparamagnetic metal nanoparticle comprising Ag, Al, Au, Co, Cu, Fe, Hf, In, Ir, Mo, Nd, Ni, Pd, Pt, Rh, Ru, Sm, Sn, Ti, V, Y, Zr, alloys thereof, or a combination comprising at least one of the foregoing, and a functionalized carbonaceous coating comprising a carbon onion structure, nanotubes, fullerene structure, graphite, graphene, carbon black, a worm-like graphene structure, or a combination comprising at least one of the foregoing structures coating the metal nanoparticle; and an aqueous or non-aqueous base fluid.

DETAILED DESCRIPTION

Disclosed herein are magnetorheological fluids based on nanoparticulate metals with a carbonaceous coating. A field-sensitive rheological fluid, sometimes referred to in the art as a "smart fluid", includes both magneto- and electrorheological fluids prepared from a nanoparticle composition of a metallic nanoparticle having a carbonaceous coating and dispersed in a fluid. Such materials provide a high degree of polarizability and possess ferromagnetic or superparamagnetic properties, and hence solution structuring necessary to form linear or network arrangements upon exposing the magnetorheological fluid to a permanent or electrically-induced magnetic field. The nanoparticle composition, because of its high thermal stability and strong ferromagnetic or superparamagnetic properties, also imparts improved high temperature performance to the magnetorheological fluids.

In an embodiment, a field-sensitive rheological fluid is a magnetorheological fluid comprising a nanoparticle composition comprising a ferromagnetic or superparamagnetic metal nanoparticle, and a functionalized carbonaceous coating on a surface of the metal nanoparticle.

Nanoparticles are particles with an average particle size (largest average dimension) of about 1 nanometer (nm) to less than about 1 micrometer ($\mu$m). In some embodiments, the nanoparticles have an average particle size of less than about 1 micrometer ($\mu$m), and more specifically a largest average dimension less than or equal to about 500 nanometer (nm), and still more specifically less than or equal to about 250 nm, where particle sizes of greater than about 250 nm to less than about 1 $\mu$m are also be referred to in the art as "sub-micron sized particles." As used herein, "average particle size" refers to particle size measurements based on number average particle size measurements, which can be routinely obtained by laser light scattering methods such as static or dynamic light scattering (SLS or DLS, respectively). Also in an embodiment, the nanoparticles have an aspect ratio of greater than about 1, in an embodiment, greater than about 10, and in another embodiment, greater than about 50.

The metal includes any metal suitable for use in a magnetorheological application. In an embodiment, the ferromagnetic metal nanoparticle comprises any metal useful for forming a magnetizable composition or alloy. Useful metals include in particular those of the group 6, 7, 8, 9, 10, and 11 metals, as well as main group metals and the lanthanides. Exemplary metals for this purpose include Ag, Al, Au, Co, Cu, Fe, Hf, In, Ir, Mo, Nd, Ni, Pd, Pt, Rh, Ru, Sm, Sn, Ti, V, Y, Zr, alloys thereof, or a combination comprising at least one of the foregoing. In another embodiment, exemplary ferromagnetic metals include Fe, Co, Ni, Nd, Sm, alloys thereof, and combinations comprising at least one of the foregoing. In an embodiment, the metal nanoparticles have a number average particle size of about 1 to about 100 nm, in an embodiment, about 5 to about 75 nm, and in another embodiment, about 10 to about 50 nm.

Combinations of nanoparticles may also be used as the nanoparticles. Included in the combination are nanoparticles such as graphene, having an aspect ratio of greater than about 1, and in an embodiment, greater than about 10; graphene fiber; nanotubes, including carbon nanotubes, metallic nanotubes, and inorganic nanotubes such as boron nitride nanotubes, where the nanotubes are single-walled nanotubes (SWNT), multiwalled nanotubes (MWNT), or combinations of these; fullerenes, such as any of the known cage-like hollow allotropic forms of carbon possessing a polyhedral structure and which include, for example, from about 20 to about 100 carbon atoms, and included as closo- or nido-structures, where exemplary fullerenes include, for example, $C_{60}$ which is a fullerene having 60 carbon atoms and high symmetry ($D_{5h}$), $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like; graphite, including nanographite, which is a nano-scale cluster of plate-like sheets composed of fused 6-membered delocalized pi-electron carbon rings, in which a stacked structure of one or more layers having a plate-like two dimensional structure of carbon in the form of fused hexagonal rings with an extended delocalized π-electron system, which are layered and weakly bonded to one another through π-π stacking interaction, and where nanographite has a layered structure of greater than or equal to about 50 single sheet layers, specifically greater than or equal to about 100 single sheet layers, and more specifically greater than or equal to about 500 single sheet layers; carbon black including conductive and non-conductive carbon blacks; nanoclays including hydrated or anhydrous silicate minerals with a layered structure and such as alumino-silicate clays such as kaolins including halloysite, smectites including montmorillonite, illite, and the like and which are exfoliated to separate individual sheets, or are non-exfoliated; inorganic nanoparticles including a metal or metalloid carbide such as tungsten carbide, silicon carbide, boron carbide, a metal or metalloid nitride such as titanium nitride, boron nitride, silicon nitride, a metal or metalloid oxide such as titanium oxide, alumina, silica, tungsten oxide, and iron oxides; or a combination comprising at least one of the foregoing.

The nanoparticles are functionalized to introduce chemical functionality to the nanoparticle composition. In an embodiment, the nanoparticle is functionalized via the carbonaceous coating to include functionality for adjusting surface properties and blendability of the nanoparticles with a matrix (e.g., base fluids for the magnetorheological fluid solution, etc.). In an embodiment, functional groups include carboxy (e.g., carboxylic acid groups), epoxy, ether, ketone, amine, hydroxy, alkoxy, alkyl, aryl, aralkyl, alkaryl, lactone, functionalized polymeric or oligomeric groups, ionic groups such as ammonium groups and/or carboxylate salt groups, or a combination comprising at least one of the forgoing functional groups.

In another embodiment, the nanoparticle composition is further derivatized by grafting certain polymer chains to the functional groups. For example, polymer chains such as acrylic chains having carboxylic acid functional groups, hydroxy functional groups, and/or amine functional groups; polyamines such as polyethyleneamine or polyethyleneimine; and poly(alkylene glycols) such as poly(ethylene glycol) and poly(propylene glycol), may be included by reaction with functional groups.

In an embodiment, the nanoparticle composition further comprises an additional nanoparticle, the additional nanoparticle being derivatized or underivatized and comprising graphene, graphene fiber, nanotube, fullerene, graphite, carbon black, nanoclay, inorganic nanoparticle, or a combination comprising at least one of the foregoing.

The coating for the metal nanoparticles is a functionalized carbonaceous coating that includes carbon structural motifs based on delocalized 5-, 6-, and/or 7-membered carbon rings. In an embodiment, the carbonaceous coating includes regular and amorphous carbon, and includes at least 6-membered fused carbon rings having an extended pi-electron system. Exemplary carbonaceous coatings include those comprising a carbon onion structure, which includes graphitic 6-membered carbon rings arranged in layers; nanotubes, including carbon nanotubes, and carbon-inorganic nanotubes, where the nanotubes are single-walled nanotubes (SWNT), multi-walled nanotubes (MWNT), or combinations of these; fullerene structures; graphite, including nanographite; graphene, carbon black, a worm-like graphene structure, or a combination comprising at least one of the foregoing structures. It will be further understood that the coating includes one or more, and in an embodiment, two or more, of these structural motifs as an integral part of the contiguous carbonaceous coating, as tethered units, or a combination comprising at least one of the foregoing. In an embodiment, the coating is less than or equal to about 20 nm, in another embodiment, less than or equal to 10 nm, and in another embodiment, less than or equal to 5 nm thickness. In an exemplary embodiment, the coating includes particles having a number average particle size of about 1 to about 5 nm, and in another exemplary embodiment, about 1 to about 2 nm.

Metal nanoparticles coated with carbonaceous coatings can be made by any of various methods known in the art. In an embodiment, the nanoparticle composition comprises the reaction product of an organometallic compound. For example, the metal nanoparticles are formed by pyrolysis of metallocenes (ferrocene, cobaltocene, nickelocene, and ruthenocene) and their mixtures in the ethylene/hydrogen atmosphere. Pyrolysis of metallocenes produces nanoparticles and nanorods of alloys encapsulated in, for example, carbon onion-like structures, nanotubes and worm-like structures. Such materials can be prepared by methods found in the art (e.g., "Carbon nanostructures and graphite-coated metal nanostructures obtained by pyrolysis of ruthenocene and ruthenocene-ferrocene mixtures," L. S. Panchakarla, A. Govindaraj, *Bull. Mater. Sci.*, Vol. 30, No. 1, pp. 23-29, February 2007; "Carbon nanotubes by the metallocene route," Rahul Sen, A. Govindaraj and C. N. R. Rao, *Chemical Physics Letters*, Vol. 267, Issues 3-4, pp. 276-280, March 1997). In another exemplary method, noble metal particles having a carbonaceous coating can be formed which exhibit ferromagnetic properties ("Carbon-Decorated FePt Nanoparticles," Nick Caiulo, Chih Hao Yu, Kai Man K. Yu, Chester C. H. Lo, William Oduro, Benedicte Thiebaut, Peter Bishop, and Shik Chi Tsang, *Adv. Funct. Mater.*, 2007, Vol. 17, p. 1392-1396). In an exemplary embodiment, the nanoparticle composition comprises metal nanoparticles comprising Fe and Pt with a functionalized carbonaceous coating, and a number average particle size of about 1 to about 10 nm. The graphite-coated Fe—Pt particles are produced by, for example, hydrothermal treatment of Fe and Pt precursors in glucose followed by calcination at about 900° C.

Another example includes cobalt nanoparticles with graphitic coatings ("Surfactant-Free, Melt-Processable Metal-Polymer Hybrid Materials: Use of Graphene as a Dispersing Agent", Norman A. Luechinger, Norman Booth, Greg Heness, Sri Bandyopadhyay, Robert N. Grass, and Wendelin J. Stark, *Adv. Mater.* 2008, Vol. 20, pp. 3044-3049). In another exemplary embodiment, the nanoparticle composition comprises metal nanoparticles comprising Co with a particle size of about 10 to about 50 nm, and the functionalized carbonaceous coating comprises functionalized graphite particles having a particle size of about 1 to about 2 nm. The graphite-coated Co metal nanoparticles are produced by, for example, a reducing flame spray synthesis technique. All references cited are incorporated herein by reference.

Carbonaceous metal-containing structures formed by the reactive decomposition of organometallic compounds such as metallocenes are useful in the preparation of magnetorheological fluids, provided the metal-containing structures possess magnetic properties. Metallocenes and complexes containing neodymium and samarium-cobalt magnets being the strongest permanent magnets, are also of interest for the development of magnetorheological fluids, as well as magnetizable noble metal compositions (e.g., Fe, Ni, Pt, Pd, Rh, Cu, etc.) obtained from noble metal complexes.

The nanoparticle composition of the magnetorheological fluid possesses ferromagnetic or superparamagnetic properties and is capable of alignment to a magnetic field. In an embodiment, the carbonaceous coating forms shell covering all or part of the metal nanoparticle. It will be appreciated that where the shell of carbonaceous material is continuous and completely covers the metal nanoparticle, the nanoparticle composition is further electrically insulating and is also a dielectric material. The carbonaceous coating itself is polarizable in an electrical field.

In an embodiment, the coated nanoparticles are attached to or coated on a support material with low conductivity and high dielectric constant. The nanoparticle composition is thus any combination of metal nanoparticle and carbonaceous coating having suitable dielectric or magnetic properties. In some embodiments, the nanoparticles are coated on a support which is inorganic or organic, and where organic, is a conducting or non-conducting polymer. Thus in an embodiment, the support particle is a polymeric or inorganic support particle attached to or coated with the nanoparticle composition.

In an embodiment, the nanoparticle composition includes a support. Where a support is used, the nanoparticle is covalently bonded to or coated on a surface of the polymeric or inorganic support particle. Where the attachment is covalent, the nanoparticle is functionalized as above, and the support particle is functionalized to have a complementary functional group, where the artisan skilled in the art will appreciate which pairings of functional groups are complementary with those listed for the nanoparticles where functionalized. For example, where the nanoparticle has hydroxy groups, the support particle has a group such as a carboxylate, to form an ester. Similarly, where the nanoparticle has a carboxylate group on it, the support particle has a hydroxy, amine, or epoxy group. Combinations of compatible functional groups are useful, provided these groups are complementary and as such form a bond with a corresponding group on the derivatized nanoparticle.

The support material is a polymeric or inorganic particle. In some embodiments, the support material is a micro scale particle (i.e., 1 μm or greater) material. Combinations of particles, including those having different particle sizes, can also be used.

In an embodiment, the polymeric particle includes a styrenic polymer or copolymer, a (meth)acrylate polymer or copolymer, or a highly conjugated aromatic polymer. It will be appreciated that where a highly conjugated aromatic polymer is used, the polymer is in either a conducting or non-conducting (i.e., non-doped) form. As such, the polymer is polarizable and either conductive or not conductive. Also, (meth)acrylate, as used herein, indicates both acrylate and methacrylate interchangeably.

Exemplary non-conjugated polymeric particles include those formed of polystyrene, poly(styrene-co-(meth)acrylates), and poly(meth)acrylates (including metal salts of (meth)acrylic acids). Exemplary conjugated polymeric particles include those formed of polyaniline, polythiophene, polyphenylenevinylene, polypyrrole. Combinations comprising at least one of the foregoing polymers can also be used. Such highly conjugated aromatic polymers can be more readily polarized and as such have a higher dielectric constant than, for example, a poly(meth)acrylate polymer.

Similarly, inorganic support particles include both conductive and non-conductive materials. Useful inorganic particles include ceramics, metal oxides, metals, or a combination comprising at least one of the foregoing.

Exemplary ceramic support particles include barium titanyl oxalate, barium titanate, boron nitride, titanium nitride, silicon nitride, tantalum nitride, or a combination comprising at least one of the foregoing.

Exemplary metal oxide support particles include barium titanate, iron oxide, nickel oxide, cobalt oxide, tungsten oxides, titanium dioxide, zirconium dioxide, hafnium dioxide, zinc oxide, cupric oxide, cuprous oxide, alumina, silica, or a combination comprising at least one of the foregoing.

Exemplary metal particles include iron, nickel, cobalt, manganese, zinc, copper, titanium, gold, platinum, tin, aluminum, tantalum, molybdenum, rhodium, or a combination comprising at least one of the foregoing.

In an embodiment, the nanoparticle composition includes nanoparticles in an amount of about 0.1 to about 90 wt %, in an embodiment, 1 to about 80 wt %, in another embodiment about 5 to about 70 wt %, and in still another embodiment about 10 to about 50 wt %, based on the total weight of nanoparticle composition.

The magnetorheological fluid further includes as a component a base fluid. The base fluids include organic and/or inorganic fluids, and are aqueous or non-aqueous. Inorganic fluids include water, mineral acids, bases, solutions thereof, and the like. Where an aqueous fluid is used, the fluid is water or water in combination with additives including acids, bases, electrolytes, solvents, polymeric or oligomeric additives, surfactants, and a combination comprising at least one of the foregoing.

In an embodiment, the base fluid is non-aqueous, and is an organic fluid. In an exemplary embodiment, the base fluid is an oil, such as a mineral oil or petroleum distillate residue having a relatively low volatility (e.g., as obtained for hydrocarbons with an average chain length of $C_8$ or greater). In another embodiment, the base fluid is inorganic/organic hybrid fluid, such as a silicone oil including low molecular weight polydimethylsiloxanes. In another embodiment, the base fluid is an ionic liquid such as those based on halide salts of pyridinium cations, imidazolium cations, and the like.

In an embodiment, the nanoparticle composition is included in the magnetorheological fluid in an amount of about 0.1 to about 60 wt %, in an embodiment, 1 to about 50 wt %, and in another embodiment about 5 to about 45 wt %, based on the total weight of nanoparticle composition and base fluid.

The viscosity of such a fluid is about 1 centistoke or greater, but is not limited thereto. In some embodiments, the magnetorheological fluid exhibits an expansion of volume of greater than or equal to about 10%, in an embodiment, greater than or equal to about 25%, and in another embodiment, greater than or equal to about 50%.

In an embodiment, a nanoparticle composition comprises a ferromagnetic or superparamagnetic metal nanoparticle comprising Al Ag, Al, Au, Co, Cu, Fe, Hf, In, Ir, Mo, Nd, Ni, Pd, Pt, Rh, Ru, Sm, Sn, Ti, V, Y, Zr, alloys thereof, or a combination comprising at least one of the foregoing, and a functionalized carbonaceous coating comprising a carbon onion structure, nanotubes, fullerene structure, graphite, graphene, carbon black, a worm-like graphene structure, or a combination comprising at least one of the foregoing structures coating the metal nanoparticle.

In an embodiment, a ferromagnetic or superparamagnetic nanoparticle composition comprises a reaction product of an organometallic compound comprising Ag, Al, Au, Co, Cu, Fe, Hf, In, Ir, Mo, Nd, Ni, Pd, Pt, Rh, Ru, Sm, Sn, Ti, V, Y, Zr, alloys thereof, or a combination comprising at least one of the foregoing, the reaction product comprising a core of the metal of the organometallic compound, and a functionalized carbonaceous coating on a surface of the core, the functionalized carbonaceous coating comprising a carbon onion structure, nanotubes, fullerene structure, graphite, graphene, carbon black, a worm-like graphene structure, or a combination comprising at least one of the foregoing structures.

In an embodiment, a magnetorheological fluid, comprises a nanoparticle composition comprising a ferromagnetic or superparamagnetic metal nanoparticle comprising Ag, Al, Au, Co, Cu, Fe, Hf, In, Ir, Mo, Nd, Ni, Pd, Pt, Rh, Ru, Sm, Sn, Ti, V, Y, Zr, alloys thereof, or a combination comprising at least one of the foregoing, and a functionalized carbonaceous coating comprising a carbon onion structure, nanotubes, fullerene structure, graphite, graphene, carbon black, a worm-like graphene structure, or a combination comprising at least one of the foregoing structures coating the metal nanoparticle; and an aqueous or non-aqueous base fluid.

In another embodiment, a method of making a magnetorheological fluid includes forming a nanoparticle composition by reactive decomposition of a metallocene comprising Ag, Al, Au, Co, Cu, Fe, Hf, In, Ir, Mo, Nd, Ni, Pd, Pt, Rh, Ru, Sm, Sn, Ti, V, Y, Zr, alloys thereof, or a combination comprising at least one of the foregoing, the reactive decomposition product comprising a core of the metal of the organometallic compound, and a functionalized carbonaceous coating on a surface of the core, the functionalized carbonaceous coating comprising a carbon onion structure, nanotubes, fullerene structure, graphite, graphene, carbon black, a worm-like graphene structure, or a combination comprising at least one of the foregoing structures, and combining the pyrolysis product with an aqueous or non-aqueous fluid.

The nanoparticle composition reversibly forms chain or lattice structures in the base fluid upon exposure to a magnetic field. Such compositions are useful in a variety of downhole applications to generate a hydraulic pressure, which can in turn be used to actuate valves, switches, pistons, and to operate downhole tools such as expandable plugs.

While one or more embodiments have been shown and described, modifications and substitutions may be made thereto without departing from the spirit and scope of the invention. Accordingly, it is to be understood that the present invention has been described by way of illustrations and not limitation.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A nanoparticle composition comprising:
   a ferromagnetic or superparamagnetic metal nanoparticle, and
   a functionalized carbonaceous coating on a surface of the ferromagnetic or superparamagnetic metal nanoparticle,
   wherein the metal nanoparticle has an aspect ratio of greater than about 10:1.

2. The nanoparticle composition of claim 1, wherein the metal nanoparticle comprises Ag, Au, Co, Cu, Fe, Ni, Pt, alloys thereof, or a combination comprising at least one of the foregoing.

3. The nanoparticle composition of claim 1, further comprising an additional nanoparticle, the additional nanoparticle being derivatized or underivatized and comprising graphene, graphene fiber, nanotube, fullerene, graphite, carbon black, nanoclay, inorganic nanoparticle, or a combination comprising at least one of the foregoing.

4. The nanoparticle composition of claim 1, wherein the functionalized carbonaceous coating comprises a carbon onion structure, nanotubes, fullerene structure, graphite, graphene, carbon black, a worm-like graphene structure, or a combination comprising at least one of the foregoing structures.

5. The nanoparticle composition of claim 1, wherein the nanoparticle has a number averaged particle size of about 1 nanometer to less than about 1 micrometer.

6. The nanoparticle composition of claim 1, wherein the functionalized carbonaceous coating include a functional group including carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups.

7. A nanoparticle composition comprising:
   a ferromagnetic or superparamagnetic metal nanoparticle, and
   a functionalized carbonaceous coating on a surface of the ferromagnetic or superparamagnetic metal nanoparticle;
   wherein the nanoparticle composition comprises metal nanoparticle comprising Fe and Pt with a functionalized carbonaceous coating, and a number average particle size of about 1 to about 10 nm.

8. A composition, comprising a polymeric or inorganic support particle attached to or coated with the nanoparticle composition of claim 1.

9. The composition of claim 8, wherein the polymeric support particle comprises a styrenic polymer or copolymer, a (meth)acrylate polymer or copolymer, or a highly conjugated polymer.

10. The composition of claim 8, wherein the inorganic particle comprises a ceramic, a metal oxide, a metal, or a composite comprising at least one of the foregoing.

11. A magnetorheological fluid comprising the nanoparticle composition of claim 1, and an aqueous or non-aqueous base fluid.

12. The magnetorheological fluid of claim 11, wherein the non-aqueous base fluid comprises a mineral oil, a petroleum distillate residue as obtained for hydrocarbons with an average chain length of $C_8$ or greater, a silicone oil, or an ionic liquid.

13. The magnetorheological fluid of claim 11, wherein the aqueous base fluid is water or water in combination with an additive comprising acids, bases, electrolytes, solvents, polymeric or oligomeric additives, surfactants, and a combination comprising at least one of the foregoing.

14. A magnetorheological fluid, comprising:
   a nanoparticle composition comprising:
      a ferromagnetic or superparamagnetic metal nanoparticle comprising Ag, Au, Co, Cu, Fe, Ni, Pt, alloys thereof, or a combination comprising at least one of the foregoing, the metal nanoparticle having an aspect ratio of greater than about 10:1, and
      a functionalized carbonaceous coating comprising a carbon onion structure, nanotubes, fullerene structure, graphite, graphene, carbon black, a worm-like graphene structure, or a combination comprising at least one of the foregoing structures coating the metal nanoparticle; and
   an aqueous or non-aqueous base fluid.

* * * * *